United States Patent
Kuroki

(10) Patent No.: US 8,078,048 B2
(45) Date of Patent: Dec. 13, 2011

(54) IMAGING DEVICE AND VIDEO RECORDING/REPRODUCING SYSTEM

(75) Inventor: Yoshihiko Kuroki, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 12/827,850

(22) Filed: Jun. 30, 2010

(65) Prior Publication Data

US 2011/0033177 A1 Feb. 10, 2011

(30) Foreign Application Priority Data

Aug. 6, 2009 (JP) .............................. P2009-182972

(51) Int. Cl.
*G03B 41/00* (2006.01)
*G03B 35/00* (2006.01)

(52) U.S. Cl. ...................................... 396/322; 396/324

(58) Field of Classification Search .................. 396/322, 396/324
See application file for complete search history.

(56) References Cited

U.S. PATENT DOCUMENTS

| 7,061,532 B2* | 6/2006 | Silverstein | 348/335 |
| 2006/0082574 A1* | 4/2006 | Tsubaki | 345/419 |
| 2008/0285034 A1* | 11/2008 | Gharib et al. | 356/364 |
| 2009/0278954 A1* | 11/2009 | Kanamori et al. | 348/222.1 |
| 2009/0290039 A1* | 11/2009 | Kanamori et al. | 348/222.1 |

FOREIGN PATENT DOCUMENTS

JP 6-54991 7/1994

* cited by examiner

*Primary Examiner* — Rodney Fuller
(74) *Attorney, Agent, or Firm* — Finnegan, Henderson, Farabow, Garrett & Dunner, L.L.P.

(57) ABSTRACT

An imaging device includes a photographing lens configured to focus light from a subject, a splitter configured to split the focused light to left and right in an area, in which light diffused from one point of the subject becomes parallel light, so as to respectively form different polarized lights, an imaging lens configured to respectively image the split different polarized lights, a transmission unit configured to receive the imaged different polarized lights on the same plane so as to transmit any one of the polarized lights in each area of the plane, an imaging element configured to convert the transmitted light on the plane into an image according to an electronic signal, and an image generating unit configured to extract and interpolate the converted image in each area so as to generate two different images.

7 Claims, 8 Drawing Sheets

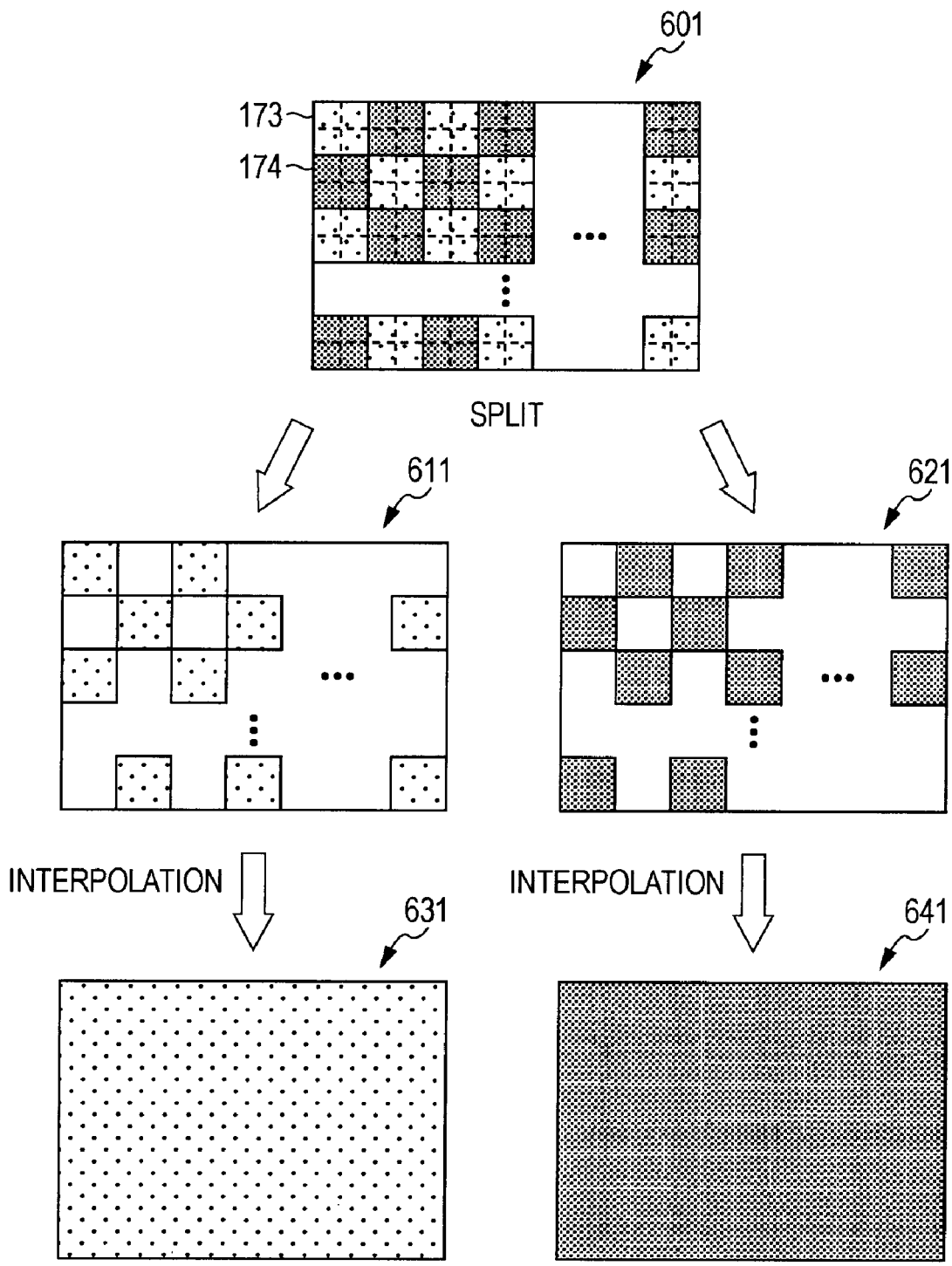

IMAGING DEVICE AND VIDEO RECORDING/REPRODUCING SYSTEM

BACKGROUND OF THE INVENTION

1. Field of the Invention

The present invention relates to an imaging device and, more particularly, to an imaging device for picking up a subject as a stereoscopic image and a video recording/reproducing system.

2. Description of the Related Art

In the related art, a system for simultaneously picking up a common subject using two left and right video cameras and simultaneously outputting the left and right videos so as to display a stereoscopic image was proposed. However, if the two video cameras are used, the size of the device is enlarged and thus this system is not practical. In addition, a base length (baseline) between the two video cameras, that is, a distance between both eyes of a stereoscopic camera, is generally about 65 mm corresponding to a distance between both eyes of a human, regardless of a zoom ratio of a lens. In this case, in a video subjected to zooming, visual disparity is increased and the visual system is forced to process information differently from the ordinary manner, thereby causing visual fatigue. In addition, when the left and right images are repeatedly viewed without change, the images are doubly photographed to become unnatural images. If the positions of both eyes are set as L and R and points on the subject are set as A and B, a corner LAR and a corner LBR are defined as absolute disparities and (corner LAR-corner LBR) is defined as a relative disparity of the point A to the point B. Hereinafter, the relative disparity is simply called a disparity.

In order to facilitate the adjustment of a lens system for performing stereoscopic photographing, a stereoscopic imaging device for combining polarization filters for performing polarization so as to satisfy a mutually orthogonal relationship such that an optical system is made common is proposed (for example, see Japanese Examined Patent Application Publication No. 6-054991 (FIG. 2)).

SUMMARY OF THE INVENTION

In the related art, outputs of two polarization filters are superposed so as to integrate optical paths into a single system such that the lens system is made common. However, in order to extract the left and right images at a subsequent stage, a polarization filter is further provided to divide the optical path itself again such that light is input to respective different polarization filters. Accordingly, since light loss occurs in the lens system, it is difficult to miniaturize the device.

It is desirable to simplify the structure of an optical system upon stereoscopic photographing and to miniaturize an imaging device.

According to an embodiment of the present invention, there is provided an imaging device including: a photographing lens configured to focus light from a subject; a splitter configured to split the focused light to left and right in an area, in which light diffused from one point of the subject becomes parallel light, so as to respectively form different polarized lights; an imaging lens configured to respectively image the split different polarized lights; a transmission unit configured to receive the imaged different polarized lights on the same plane so as to transmit any one of the polarized lights in each area of the plane; an imaging element configured to convert the transmitted light on the plane into an image according to an electronic signal; and an image generating unit configured to extract and interpolate the converted image in each area so as to generate two different images. By this configuration, the polarized lights split to the left and right are selected by the imaging element so as to generate the two different images.

The transmission unit may be a polarization member attached to a front surface of the imaging element and transmit any one of the polarized lights in each area corresponding to a pixel or a pixel group of the imaging element. By this configuration, the polarized lights split to the left and right are selected in each area corresponding to the pixel or the pixel group of the imaging element so as to generate the two different images. In this case, the pixel group may include a pixel group continuously arranged on the plane in a horizontal direction or a pixel group arranged on the plane in a quadrilateral shape.

The splitter may include symmetrical polarizing devices configured to polarize the focused light in mutually orthogonal linear directions. Alternatively, the splitter may include bilateral polarizing devices configured to polarize the focused light in mutually opposite rotation directions.

According to another embodiment of the present invention, there is provided a video recording/reproducing system including: a photographing lens configured to focus light from a subject; a splitter configured to split the focused light to the left and right in an area, in which light diffused from one point of the subject becomes parallel light, so as to respectively form different polarized lights; an imaging lens configured to respectively image the split different polarized lights; a transmission unit configured to receive the imaged different polarized lights on the same plane so as to transmit any one of the polarized lights in each area of the plane; an imaging element configured to convert the transmitted light on the plane into an image according to an electronic signal; an image generating unit configured to extract and interpolate the converted image in each area so as to generate two different images; a video recording unit configured to respectively record the generated two images in a storage unit as frames of left and right image data; and a video reproduction unit configured to simultaneously reproduce and display the left and right image data recorded in the storage unit. Therefore, the polarized lights split to the left and right is selected in the imaging element so as to generate two different images, and both the images are simultaneously reproduced and displayed.

According to the embodiments of the present invention, it is possible to simplify the structure of an optical system upon stereoscopic photographing and to miniaturize an imaging device.

BRIEF DESCRIPTION OF THE DRAWINGS

FIG. 8 is a diagram showing another attachment pattern example of the left polarization plate and the right polarization plate according to the embodiment of the present invention.

DESCRIPTION OF THE PREFERRED EMBODIMENTS

Hereinafter, modes (hereinafter, referred to as embodiments) for carrying out the present invention will be described. The description will be given in the following order.

1. First Embodiment (Same polarization in row direction: Example of imaging device)
2. Second Embodiment (Example of video recording/reproducing system)
3. Modified Example (same polarization in every block)

1. First Embodiment

Configuration Example of Imaging Device

Figure 1:
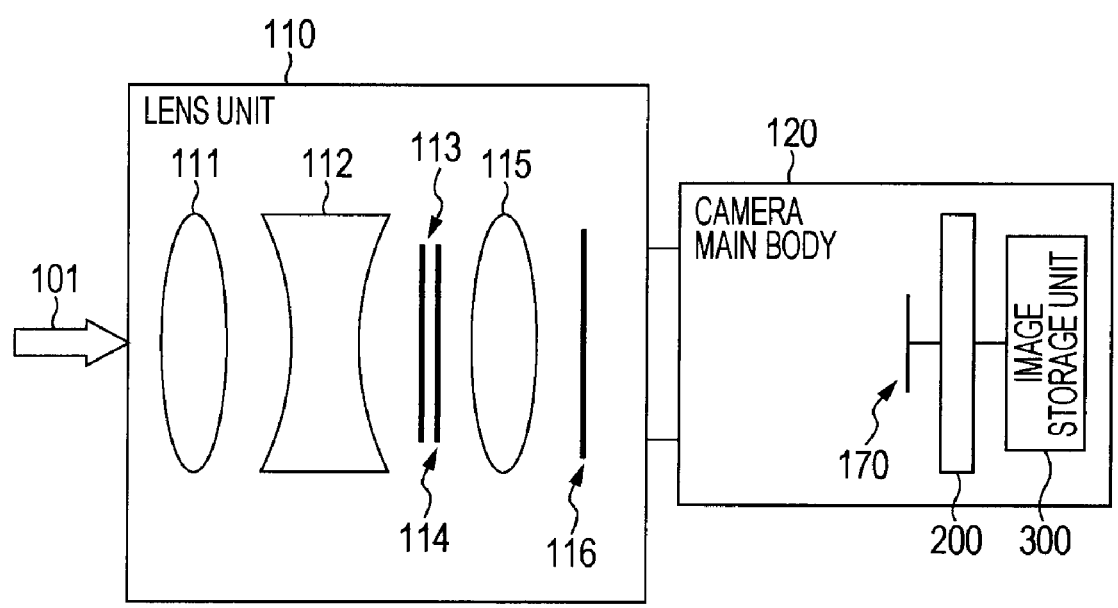
FIG. 1 is a top cross-sectional view of an example of an imaging device according to an embodiment of the present invention.

FIG. 1 is a top cross-sectional view of an example of an imaging device according to an embodiment of the present invention. This imaging device receives incident light 101 from a subject, splits the light to the left and right by a polarization filter 114, forms an image on an imaging element 170, and generates left and right video data. This imaging device includes a lens unit 110 on the pre-stage of a camera main body 120.

The lens unit 110 includes photographing lenses 111 and 112, a diaphragm 113, a polarization filter 114, and an imaging lens 115.

The photographing lenses 111 and 112 are lens for focusing the incident light 101 from the subject. These photographing lenses 111 include a focus lens for focusing, a zoom lens for enlarging the subject, and the like, and are generally realized by a combination of a plurality of lenses in order to correct chromatic aberration.

The diaphragm 113 has a narrowing function in order to adjust the quantity of focused light. The diaphragm 113 is generally composed of a plurality of plate-shaped blades. At the position of the diaphragm 113, light diffused from one point of the subject becomes parallel light.

The polarization filter 114 splits the focused light into two different polarized lights. This polarization filter 114 is divided into symmetrical polarizing devices so as to generate polarized lights in mutually orthogonal linear directions or polarized lights in mutually opposite rotation directions at two left and right positions in regard to an upright state of the camera. This polarization filter 114 is placed to be adjacent to the diaphragm 113 in parallel. That is, this polarization filter 114 serves to split the light into two different polarized lights by the bilateral polarizing devices in an area in which the light diffused from one point of the subject becomes parallel light. The two different polarized lights are input to the imaging lens 115 so as to form an image. The polarization filter 114 is an example of a splitter described in claims.

The imaging lens 115 is a lens for imaging light received from the polarization filter 114. The light imaged by the imaging lens 115 is projected onto the imaging element 170 in the camera main body 120.

In this case, an entrance pupil 116 is placed on the side of the camera main body 120 rather than on the side of the imaging lens 115.

The camera main body 120 includes the imaging element 170, a video recording unit 200 and an video storage unit 300. The imaging element 170 is a photoelectric conversion element for converting the light received from the lens unit 110 into an electronic signal. The electronic signal converted by the imaging element 170 forms left and right video data. This imaging element 170 is realized by, for example, a Charge Coupled Device (CCD), a Complementary Metal Oxide Semiconductor (CMOS) image sensor, or the like. The video recording unit 200 records the left and right image data output from the imaging element 170 in the video storage unit 300. The video storage unit 300 stores the left and right image data output from the video recording unit 200.

Functional Configuration Example of Imaging Device

Figure 2:
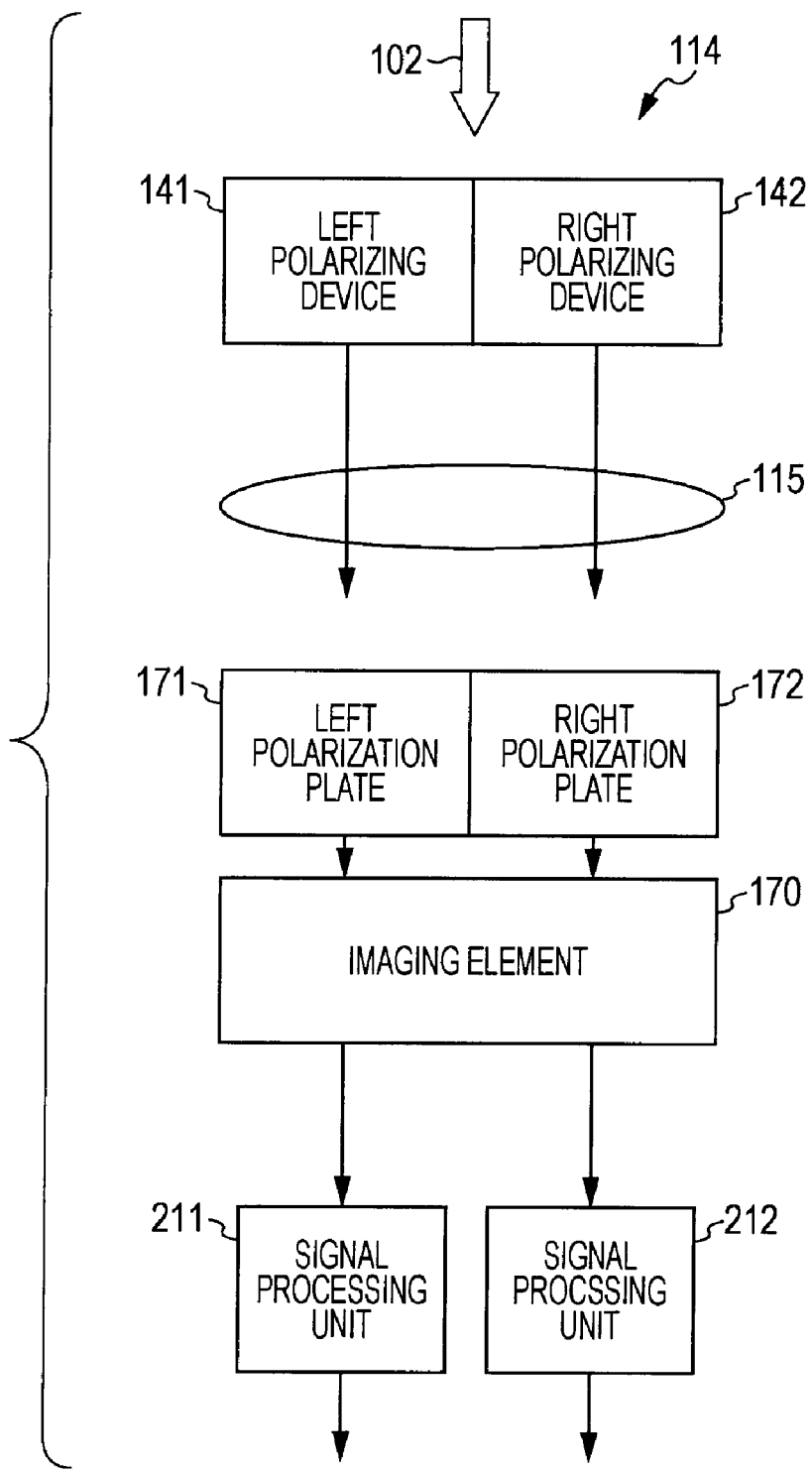
FIG. 2 is a diagram showing a functional configuration example of the imaging device according to the embodiment of the present invention.

FIG. 2 is a functional configuration example of the imaging device according to the embodiment of the present invention. The light 102 focused by the photographing lenses 111 and 112 is split into two different polarized lights by the polarization filter 114 at a position where light substantially becomes parallel light. This polarization filter 114 is divided into a left polarizing device 141 and a right polarizing device 142 so as to generate polarized lights in mutually orthogonal linear directions or polarized lights in mutually opposite rotation directions. The generated polarized lights form an image on the surface of the imaging element 170 by the imaging lens 115. The example of the shape of the left polarizing device 141 and the right polarizing device 142 will be described later.

One of a left polarization plate 171 or a right polarization plate 172 is attached to the surface of the imaging element 170 in an area corresponding to a pixel or a pixel group of the imaging element 170. Accordingly, the light polarized by the left polarization plate 171 or the right polarization plate 172 is input to each pixel of the imaging element 170. Accordingly, the left polarization plate 171 or the right polarization plate 172 transmits one of the polarized lights in each area corresponding to the pixel or the pixel group of the imaging element 170. In addition, the left polarization plate 171 and the right polarization plate 172 are an example of a transmission unit described in the claims. The attachment pattern of the left polarization plate 171 and the right polarization plate 172 will be described later.

The electronic signal photoelectrically converted by the imaging element 170 is supplied to signal processing units 211 and 212. The signal processing unit 211 generates a left-eye image during stereoscopic viewing. The signal processing unit 212 generates a right-eye image during stereoscopic viewing. The signal processing units 211 and 212 are an example of an image generating unit described in claims.

Configuration Example of Polarization Filter 114

Figure 3:
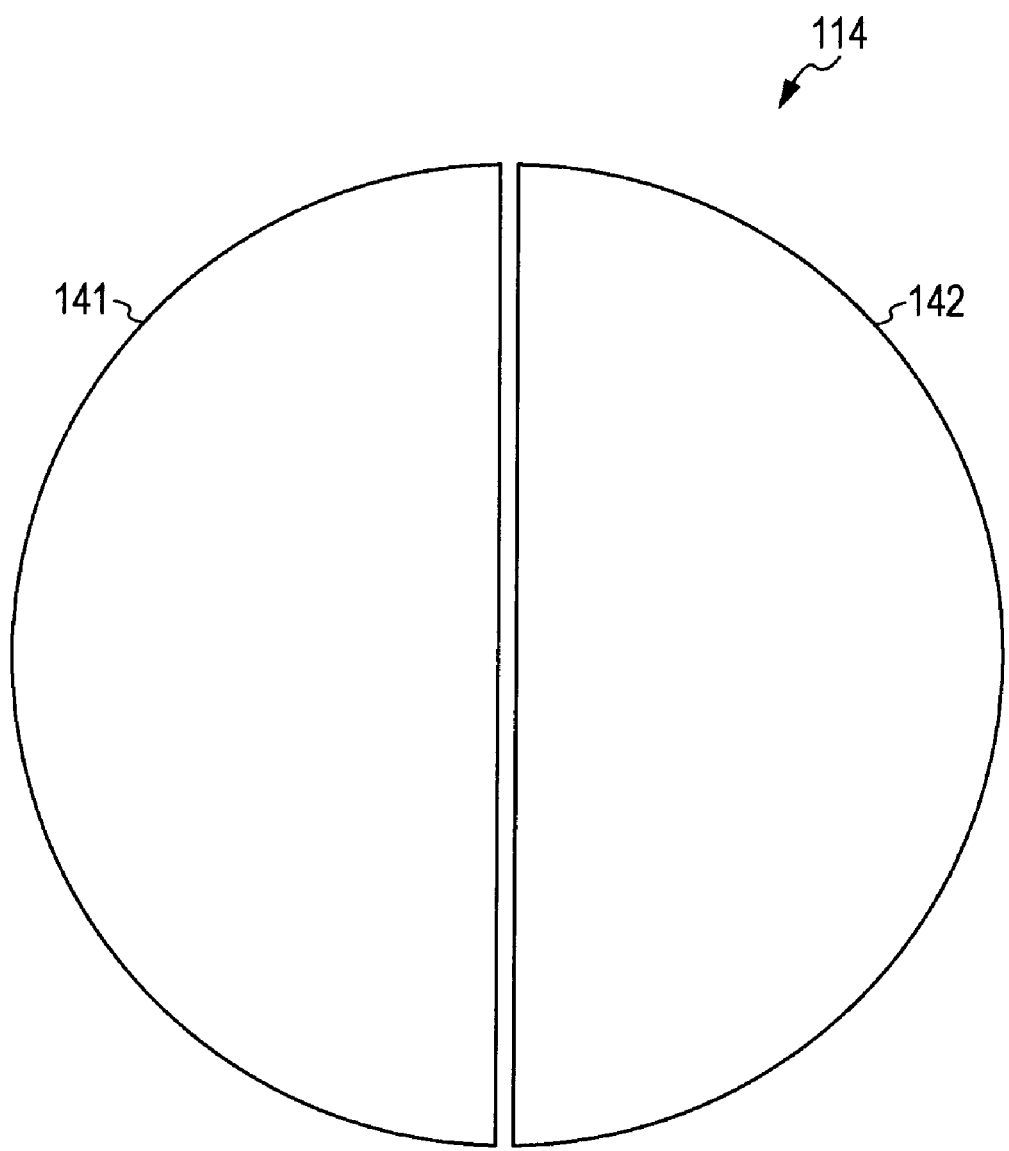
FIG. 3 is a diagram showing a configuration example of a polarization filter according to the embodiment of the present invention.

FIG. 3 is a diagram showing a configuration example of the polarization filter 114 according to the embodiment of the present invention. This polarization filter 114 wholly has a disc shape and is divided into the left polarizing device 141 and the right polarizing device 142 at a central diameter position. That is, the left polarizing device 141 and the right polarizing device 142 are symmetrical.

The left polarizing device 141 is a filter for performing polarization with respect to an image obtained when the left eye views the subject. The right polarizing device 142 is a filter for performing polarization with respect to an image obtained when the right eye views the subject. The polarized lights in the mutually orthogonal linear directions or polarized lights in the mutually opposite rotation directions are generated by the left polarizing device 141 and the right polarizing device 142.

Attachment Pattern Example of Polarization Plate

Figure 4:
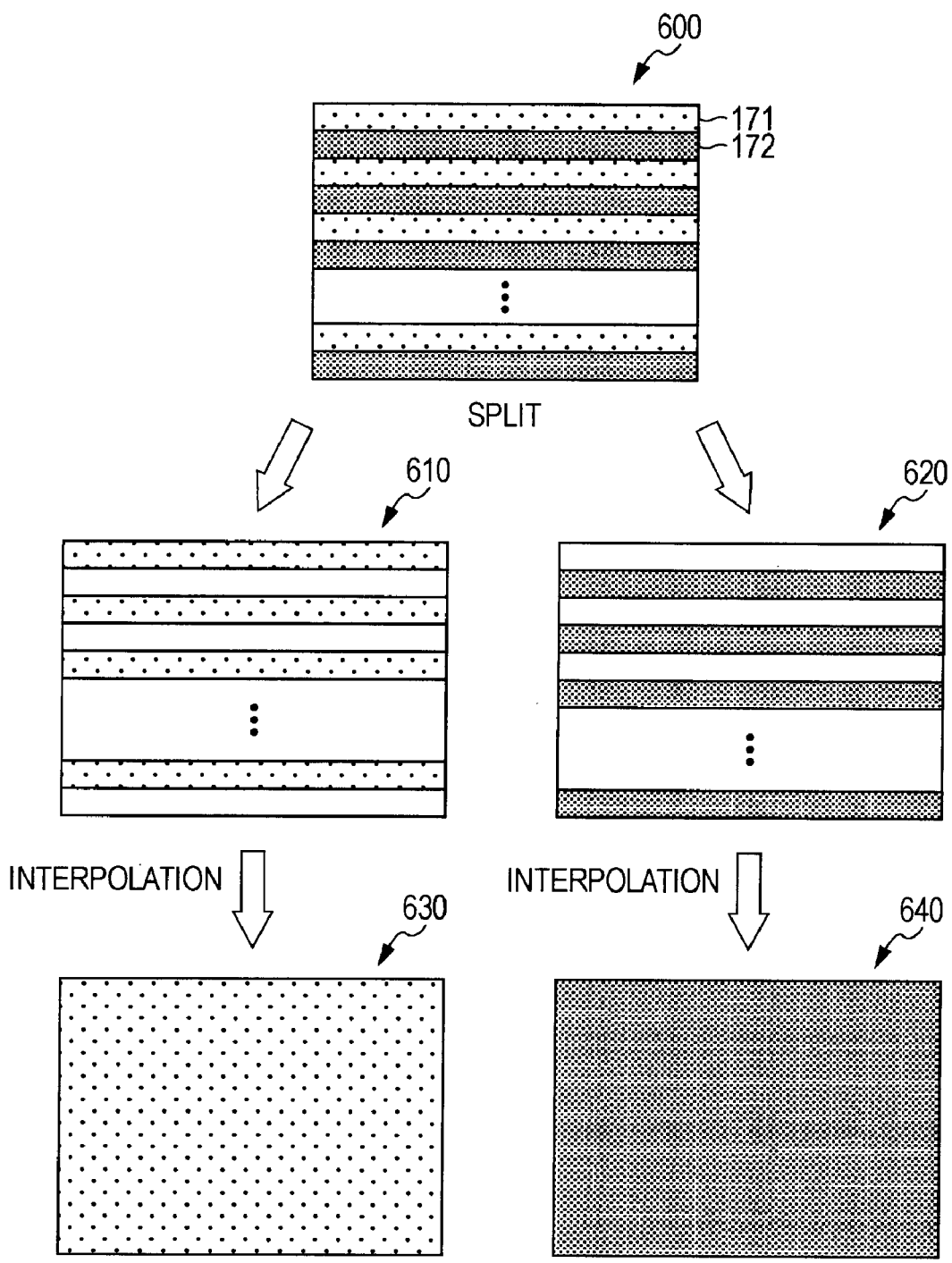
FIG. 4 is a diagram showing an attachment pattern example of a left polarization plate and a right polarization plate according to the embodiment of the present invention.

FIG. 4 is a diagram showing an attachment pattern example of the left polarization plate 171 and the right polarization plate 172 according to the embodiment of the present invention. In this example, the left polarization plate 171 and the right polarization plate 172 are arranged on a plane which is a surface of the imaging element 170 to transmit the polarized light of the same direction with respect to the pixel group continuously arranged in a horizontal direction. For example, in consideration of a hi-vision image 600 formed of 1080 pixels×1920 pixels, polarization plates for performing polarization in different directions are alternately arranged using a rectangle covering 3840 pixels formed of 2 pixels×1920 pixels as a unit.

The left polarization plate 171 has polarization characteristics of the same direction as the left polarizing device 141 and transmits only the light polarized by the left polarizing device 141. Similarly, the right polarization plate 172 has polarization characteristics of the same direction as the right polarizing device 142 and transmits only the light polarized by the right polarizing device 142. Accordingly, in the imaging element 170, the image 600 in which the light polarized by the left polarizing device 141 and the light polarized by the right polarizing device 142 are alternately repeated in a column direction is generated.

Based on the generated image 600, the signal processing units 211 and 212 split the light polarized by the left polarizing device 141 and the light polarized by the right polarizing device 142. That is, the signal processing unit 211 generates an image 610 formed of only the light polarized by the left polarizing device 141 and the signal processing unit 212 generates an image 620 formed of only the light polarized by the right polarizing device 142.

The images 610 and 620 are in a tooth missing state as shown in the same drawing. The signal processing units 211 and 212 perform demosaic processing and interpolation processing with respect to the images 610 and 620 so as to generate a left-eye image 630 and a right-eye image 640.

Figure 5:
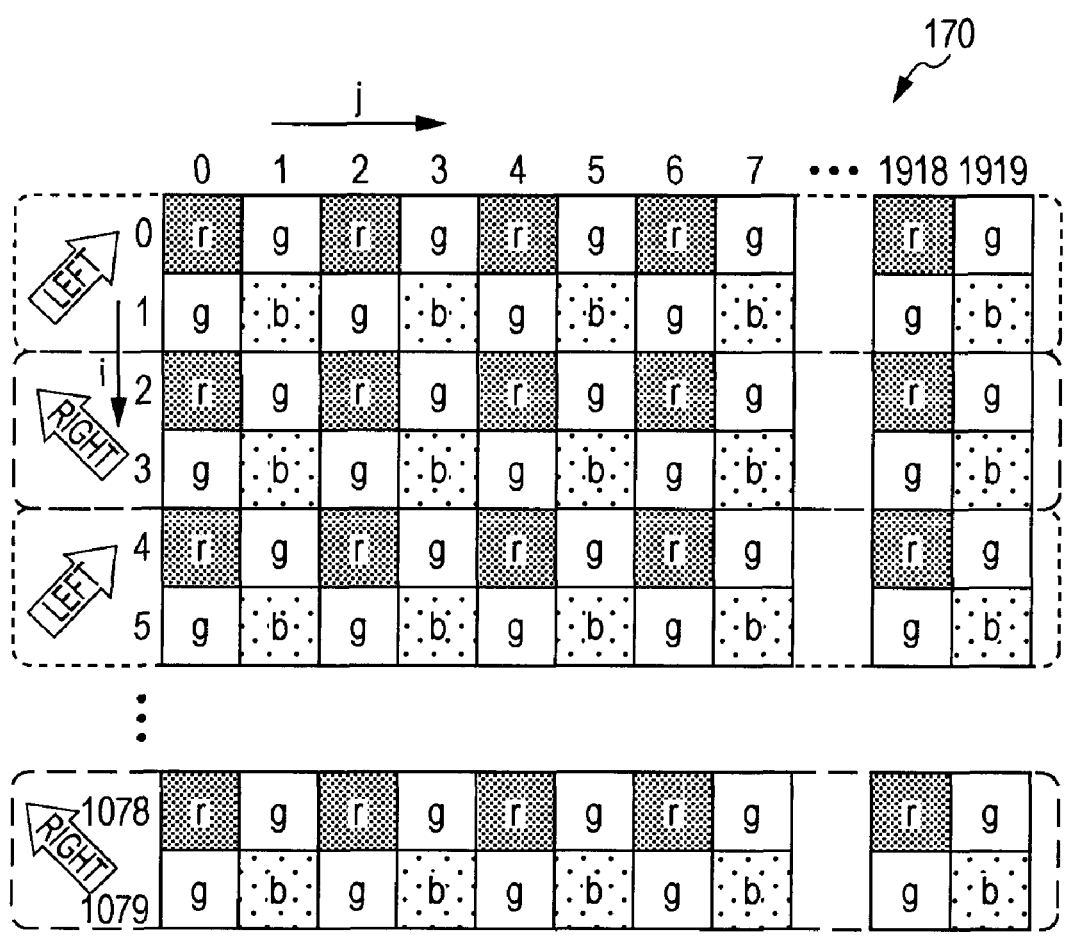
FIG. 5 is a diagram showing a relationship between the attachment pattern of the left polarization plate and the right polarization plate and pixels according to the embodiment of the present invention.

FIG. 5 is a diagram showing a relationship between the attachment pattern of the left polarization plate 171 and the right polarization plate 172 and pixels according to the embodiment of the present invention. In this example, with respect to a hi-vision image formed of 1080 pixels×1902 pixels, polarization pattern plates for performing polarization in different directions are alternately arranged using a rectangle covering 3840 pixels formed of 2 pixels×1920 pixels as a unit.

This arrangement is obtained on the assumption that the pixels are arranged in the imaging element 170 by a Bayer array and considers that the scan line of a horizontal direction is made into the same polarization and a set of pixels of RGB is made into the same polarization. That is, in consideration of drawing affinity, making the scan line into the same polarization is reasonable with regard to human visual characteristics. In addition, a block of 2 pixels×2 pixels includes one red pixel, one blue pixel and two green pixels and thus is convenient at the time of demosaic and interpolation processing.

Demosaic Example of Pixel Value

Figure 6:
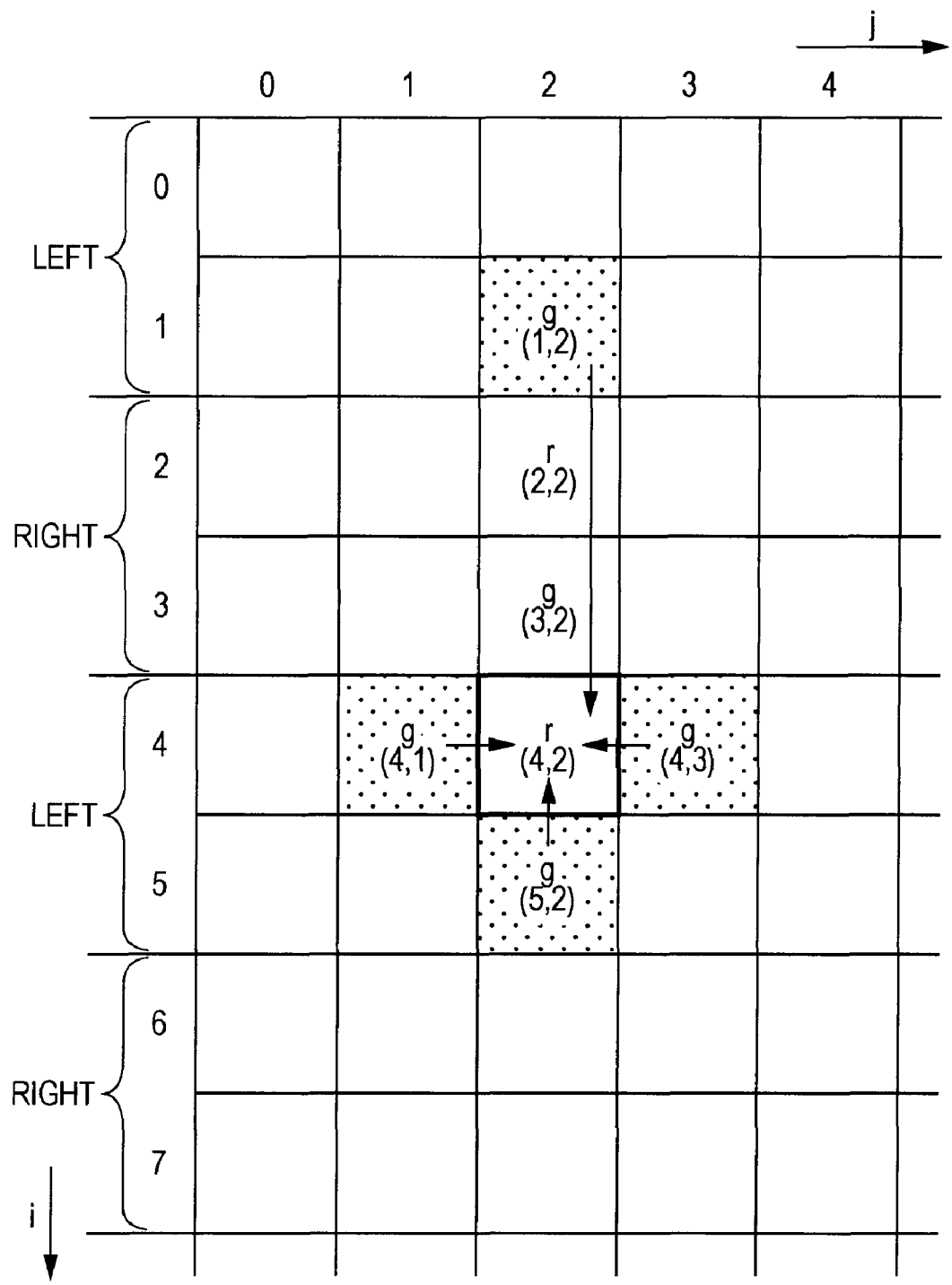
FIG. 6 is a diagram showing a demosaic example of a pixel value according to the embodiment of the present invention.

FIG. 6 is a diagram showing a demosaic example of a pixel value according to the embodiment of the present invention. Here, an example of generating a green pixel value of a left-eye image is shown. In general demosaic processing, an average value of adjacent pixel values of the same color is generally used. However, in the case where the left-eye image and the right-eye image are repeated every two lines as in the embodiment of the present invention, if the adjacent values are used, an original image may not be obtained. In the embodiment of the present invention, a determination as to whether a referred pixel value corresponds to the left-eye image or the right-eye image is made and then demosaic processing is performed.

In a Bayer arrangement, a red pixel is arranged at a position (4, 2). At this time, in order to generate a green pixel value g corresponding to the position (4, 2), calculation expressed by the following equation is performed.

$$g_{4,2} = (g_{4,1} + g_{4,3} + g_{5,2} + g_{1,2} \times W_3)/(3.0 + W_3)$$

where, $g_{i,j}$ denotes a green pixel value at a position (i, j). In addition, "3.0" corresponds to a total sum of weights when distances from a target pixel $g_{4,2}$ to adjacent pixels $g_{4,1}$, $g_{4,3}$, $g_{5,2}$ are, for example, "1.0" and the inverse numbers thereof are weights. $w_3$ denotes the weight of a pixel value separated by three pixels and, in this case, similarly has a value of "⅓".

If the above equation is generalized, the following equation is obtained.

If i is an even number (position of the red pixel r):

$$g_{i,j} = (g_{i,j-1} \times W_1 + g_{i,j+1} \times W_1 + g_{i+1,j} \times W_1 + g_{i-3,j} \times W_3)/(W_1 \times 3.0 + W_3)$$

If i is an odd number (position of the blue pixel b):

$$g_{i,j} = (g_{i,j-1} \times W_1 + g_{i,j+1} \times W_1 + g_{i-1,j} \times W_1 + g_{i+3,j} \times W_3)/(W_1 \times 3.0 + W_3)$$

where, $W_1 = 1.0$ and $W_3 = ⅓$.

The other red pixel r and blue pixel b may be subjected to demosaic processing by the same method.

By the demosaic processing, the pixel values of RGB become equal with respect to each pixel position. In this step, the images 610 and 620 of FIG. 4 are in the tooth missing state. Therefore, with respect to an area in which a pixel value is not present, the pixel value may be generated by interpolation. As an interpolation method, an average value of adjacent values may be used. This interpolation processing may be concurrently performed with the demosaic processing.

According to the first embodiment of the present invention, the lights laterally split by the polarization filter 114 are selectively transmitted by the polarization plates 171 and 172 attached to the surface of the imaging element 170 every two lines, thereby generating left and right images.

2. Second Embodiment

Configuration Example of Video Recording/Reproducing System

Figure 7:
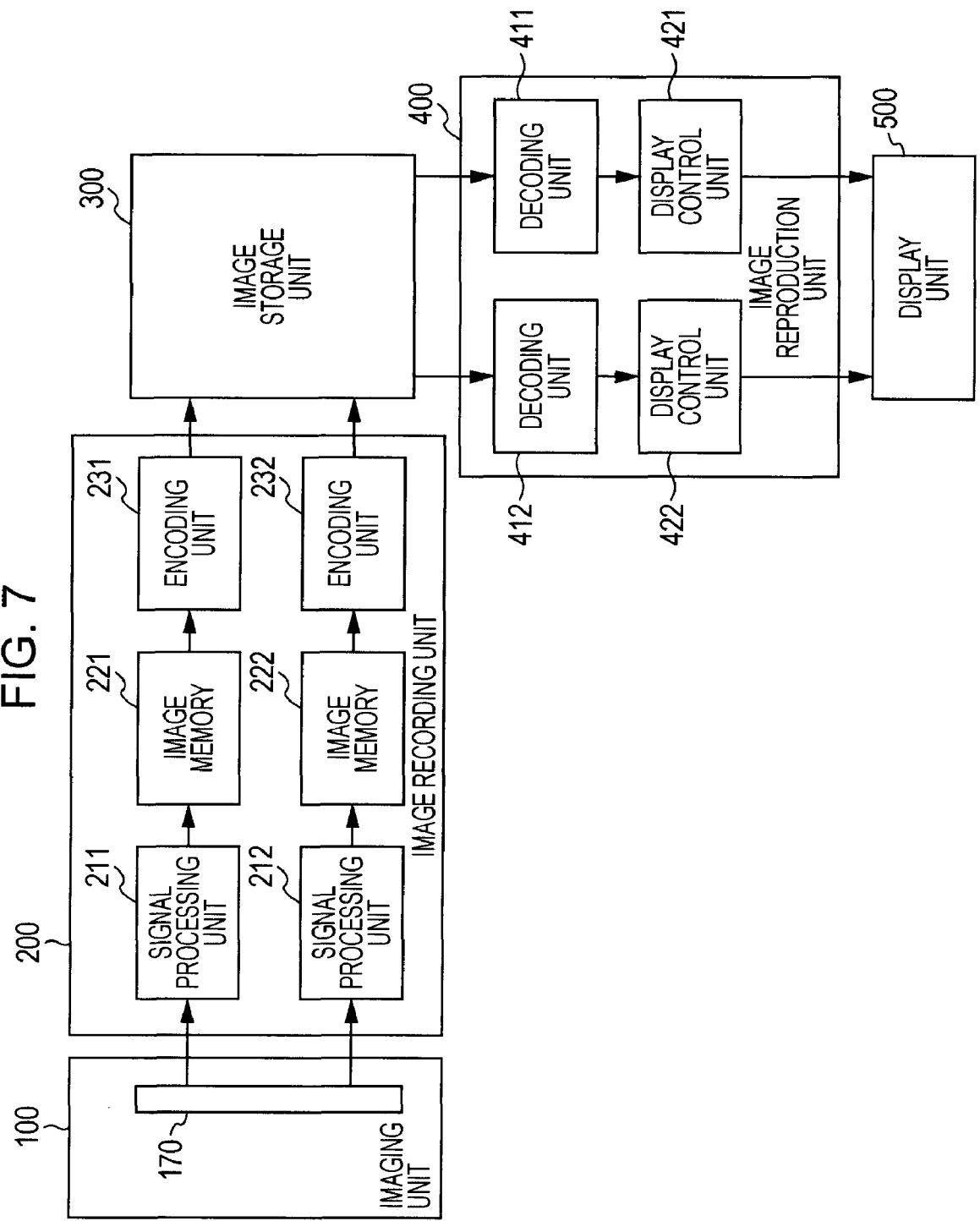
FIG. 7 is a diagram showing a configuration example of a video recording/reproducing system according to an embodiment of the present invention.

FIG. 7 is a diagram showing a configuration example of a video recording/reproducing system according to an embodiment of the present invention. This video recording/reproducing system includes an imaging unit 100, a video recording unit 200, a video storage unit 300, a video reproduction unit 400, and a display unit 500.

The imaging unit 100 corresponds to the above-described imaging device, receives incident light from a subject, and generates left and right images 610 and 620 in a tooth missing state by the imaging element 170.

The video recording unit 200 performs demosaic processing and interpolation processing with respect to the left and right images 610 and 620 output from the imaging unit 100 and records a left-eye image 630 and a right-eye image 640 in the video storage unit 300. This video recording unit 200 includes signal processing units 211 and 212, image memories 221 and 222, and encoding units 231 and 232, in correspondence with the left and right images 610 and 620. The signal processing units 211 and 212 receive the left and right images 610 and 620 output from the imaging unit 100 and perform predetermined signal processing. These signal processing units 211 and 212 analog-to-digital (A/D) convert the imaging data and perform white balance correction or the like. The signal processing units 211 and 212 perform demosaic processing and interpolation processing with respect to the left and right images 610 and 620. The image memories 221 and 222 are memories for temporarily storing the image data processed by the signal processing units 211 and 212. The encoding units 231 and 232 encode the image data stored in the image memories 221 and 222 and output the encoded image data to the video storage unit 300.

The video storage unit 300 stores the left and right image data (the left-eye image 630 and the right-eye image 640) output from the video recording unit 200. The image data stored in the video storage unit 300 is read from the video reproduction unit 400.

The video reproduction unit 400 reads and reproduces the image data stored in the video storage unit 300. This video reproduction unit 400 includes decoding units 411 and 412 and display control units 421 and 422 in correspondence with the left and right image data. The decoding units 411 and 412 decode the left and right image data read from the video storage unit 300. The display control units 421 and 422 control the left and right image data decoded by the decoding units 411 and 412 to be displayed on the display unit 500.

The display unit 500 displays the left and right image data output from the video reproduction unit 400. As the display unit 500, for example, a mode in which circular polarized light or linear polarized light filters are mounted in two projectors so as to provide left-eye and right-eye images such that the images are viewed using circular polarized light or linear polarized light glasses corresponding to the display is considered. In a flat panel display having a filter attached thereto, left-eye and right-eye images may be simultaneously provided and a glassless stereoscopic display device of a lenticular lens or parallax barrier system may be used. In the embodiment of the present invention, the left and right images are not alternately provided, but are simultaneously provided, thereby reducing visual fatigue.

In the embodiment of the present invention, from the generation of the image data in the imaging unit 100 to the display of the image data in the display unit 500, a high frame rate is provided so as to eliminate blur due to motion or jerkiness. Blur due to motion frequently occurs due to a slip of an image on a retina, in addition to deterioration in Modulation Transfer Function (MTF) upon photographing, and, more particularly, when following and viewing a subject moving in a hold-type display (following viewing). The hold-type display indicates that an image is continuously displayed on a film, a liquid crystal projector or the like during a frame period. Jerkiness indicates that smoothness of an image is lost and motion is awkward. Jerkiness frequently occurs when an image photographed using a high-speed shutter is viewed in a state in which a visual line is fixed (fixing viewing). Such deterioration in moving image quality depends on a frame rate upon photographing and display, an aperture ratio (aperture time/frame time) of camera photographing, visual characteristics or the like.

A frame rate of 24 frames (24 Hz) per second is used in movies and a frame rate of 60 fields (60 Hz) per second is generally used in television. In the embodiment of the present invention, in consideration of blur due to motion or jerkiness, a captured image is generated from an electronic signal at a rate of 60 or more frames (60 Hz) per second and preferably a rate of 230 to 250 frames (240 Hz±10 Hz). Accordingly, lack of resolution is solved in regards to time.

According to the second embodiment of the present invention, since the left-eye and right-eye images selectively transmitted by the polarization plates 171 and 172 attached to the surface of the imaging element 170 at an interval of two lines are subjected to demosaic and interpolation processing, it is possible to reproduce and display a stereoscopic image with high quality.

3. Modified Example

Another Attachment Pattern Example of Polarization Plate

FIG. 8 is a diagram showing another attachment pattern example of a left polarization plate 171 and a right polarization plate 172 according to an embodiment of the present invention. In this example, a left polarization plate 173 and a right polarization plate 174 are arranged on a plane, which is a surface of an imaging element 170, to transmit polarized light of the same direction with respect to the pixel group arranged in a quadrilateral shape (block shape). For example, polarization plates for performing polarization in different directions are alternately arranged using a 4-pixel block composed of 2 pixels×2 pixels as a unit.

The left polarization plate 173 has the polarization characteristics of the same direction as the left polarizing device 141 and transmits only the light polarized by the left polarizing device 141. Similarly, the right polarization plate 174 has the polarization characteristics of the same direction as the right polarizing device 142 and transmits only the light polarized by the right polarizing device 142. Accordingly, in the imaging element 170, an image 601 in which the light polarized by the left polarizing device 141 and the light polarized by the right polarizing device 142 are alternately repeated in a column direction is generated.

Based on the generated image 601, the signal processing units 211 and 212 divide the light polarized by the left polarizing device 141 and the light polarized by the right polarizing device 142. That is, the signal processing unit 211 generates an image 611 composed of only the light polarized by the left polarizing device 141 and the signal processing unit 212 generates an image 621 composed of only the light polarized by the right polarizing device 142.

The images 611 and 621 are in a tooth missing state as shown in the same drawing. The signal processing units 211 and 212 respectively perform demosaic processing and interpolation processing with respect to the images 611 and 621 and generate a left-eye 631 and a right-eye image 641. The demosaic processing and the interpolation processing of this modified example may be properly performed based on other pixel values of the same left-eye and right-eye images, similar to the above-described example.

The embodiments of the present invention are examples for embodying the present invention and, as defined in the embodiments of the present invention, the matters of the embodiments of the present invention correspond to specific matters of the claims. Similarly, specific matters of the claims correspond to matters of the embodiments of the present invention to which the same names are attached. The present invention is not limited to the embodiments and may be embodied by various modifying the embodiments without departing from the scope of the present invention.

The procedures described in the embodiments of the present invention may be treated as a method having a series of procedures and may be treated as a program for executing a series of procedures on a computer or a recording medium for storing the program. As this recording medium, for example, a Compact Disc (CD), a Mini Disc (MD), a Digital Versatile Disk (DVD), a memory card, a Blu-ray Disc (registered trademark) or the like may be used.

The present application contains subject matter related to that disclosed in Japanese Priority Patent Application JP 2009-182972 filed in the Japan Patent Office on Aug. 6, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging device comprising:
    a photographing lens configured to focus light from a subject;
    a splitter configured to split the focused light to left and right in an area, in which light diffused from one point of the subject becomes parallel light, so as to respectively form different polarized lights;
    an imaging lens configured to respectively image the split different polarized lights;
    a transmission unit configured to receive the imaged different polarized lights on the same plane so as to transmit any one of the polarized lights in each area of the plane;
    an imaging element configured to convert the transmitted light on the plane into an image according to an electronic signal; and
    an image generating unit configured to extract and interpolate the converted image in each area so as to generate two different images.

2. The imaging device according to claim 1, wherein the transmission unit is a polarization member attached to a front surface of the imaging element and transmits any one of the polarized lights in each area corresponding to a pixel or a pixel group of the imaging element.

3. The imaging device according to claim 2, wherein the pixel group includes a pixel group continuously arranged on the plane in a horizontal direction.

4. The imaging device according to claim 2, wherein the pixel group includes a pixel group arranged on the plane in a quadrilateral shape.

5. The imaging device according to claim 1, wherein the splitter includes symmetrical polarizing devices configured to polarize the focused light in mutually orthogonal linear directions.

6. The imaging device according to claim 1, wherein the splitter includes symmetrical polarizing devices configured to polarize the focused light in mutually opposite rotation directions.

7. A video recording/reproducing system comprising:
    a photographing lens configured to focus light from a subject;
    a splitter configured to split the focused light to left and right in an area, in which light diffused from one point of the subject becomes parallel light, so as to respectively form different polarized lights;
    an imaging lens configured to respectively image the split different polarized lights;
    a transmission unit configured to receive the imaged different polarized lights on the same plane so as to transmit any one of the polarized lights in each area of the plane;
    an imaging element configured to convert the transmitted light on the plane into an image according to an electronic signal;
    an image generating unit configured to extract and interpolate the converted image in each area so as to generate two different images;
    a video recording unit configured to record the generated two images in a storage unit as frames of left and right video data; and
    a video reproduction unit configured to simultaneously reproduce and display the left and right video data recorded in the storage unit.

* * * * *